June 30, 1964    H. N. HALL    3,139,048
REFRACTORY BRICK AND FURNACE CONSTRUCTION
Filed Nov. 16, 1960    3 Sheets-Sheet 1
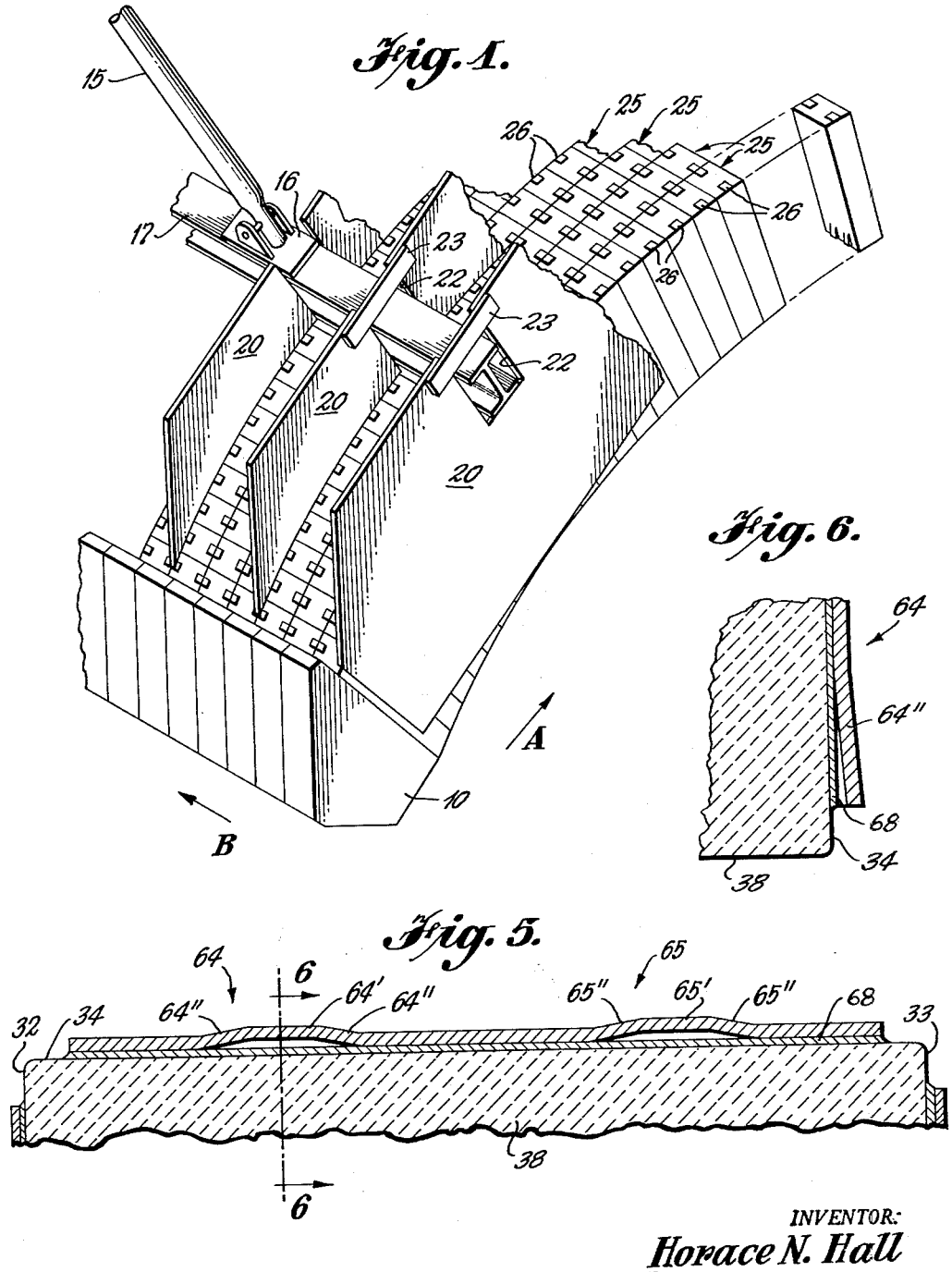
INVENTOR:
Horace N. Hall
BY
ATTORNEY

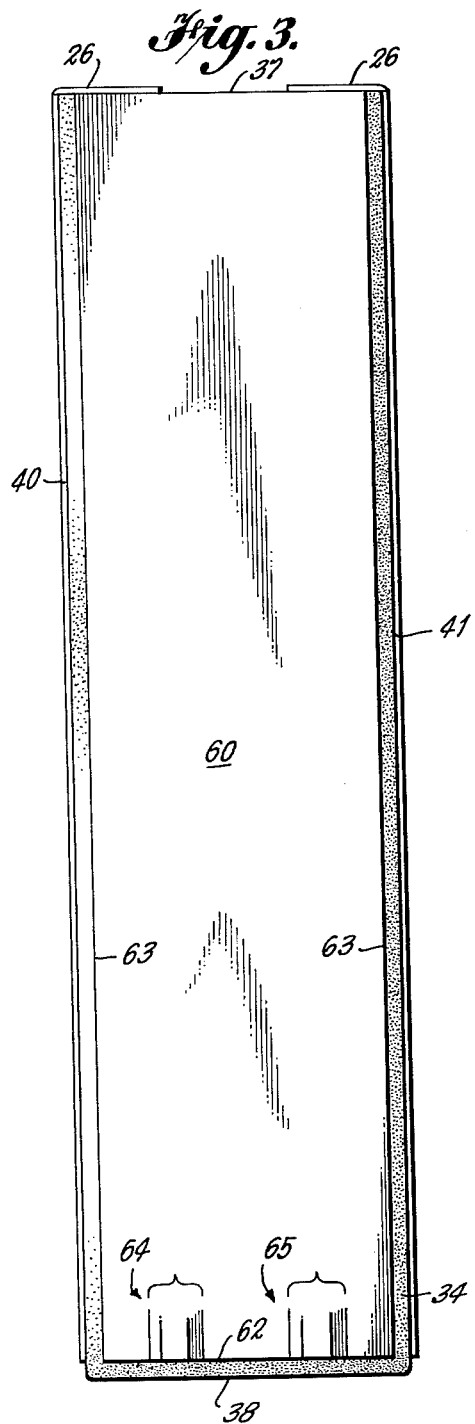
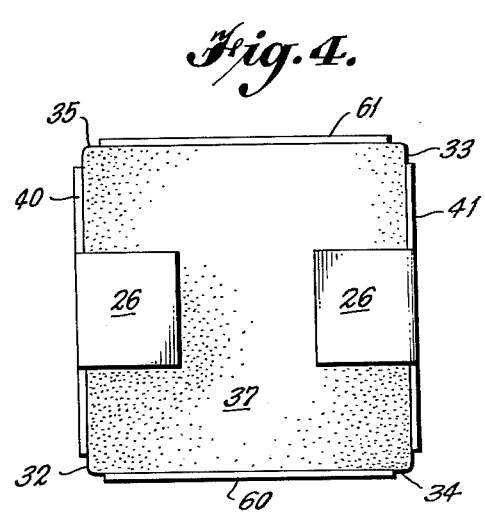
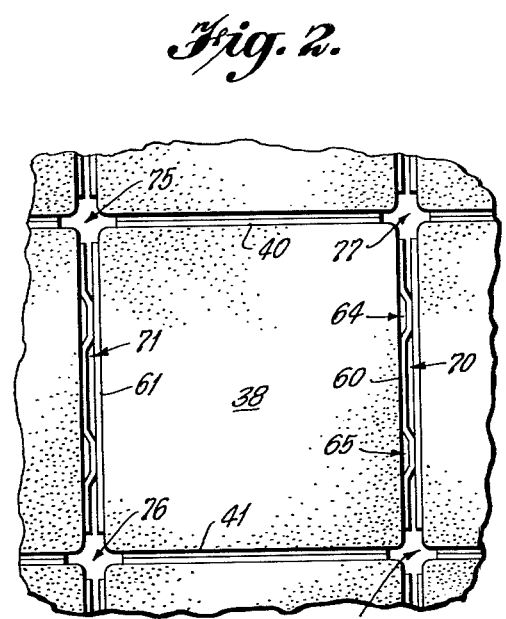

June 30, 1964     H. N. HALL     3,139,048
REFRACTORY BRICK AND FURNACE CONSTRUCTION
Filed Nov. 16, 1960     3 Sheets-Sheet 3
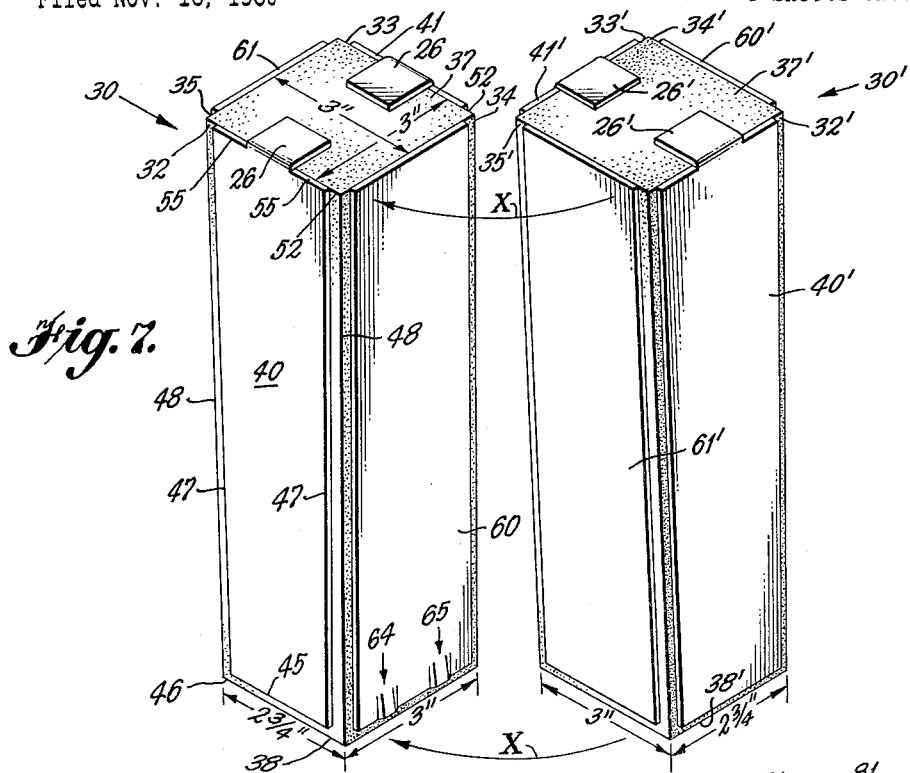
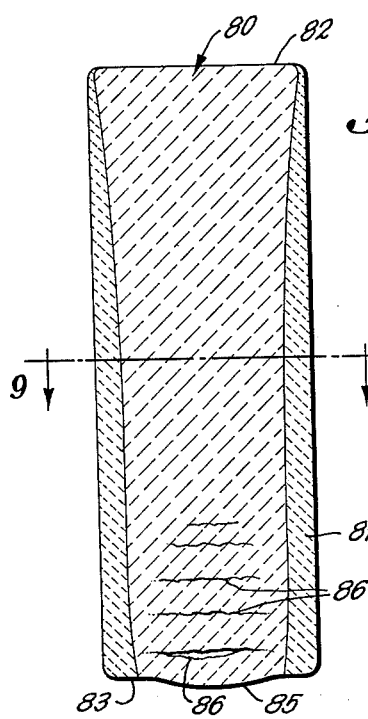
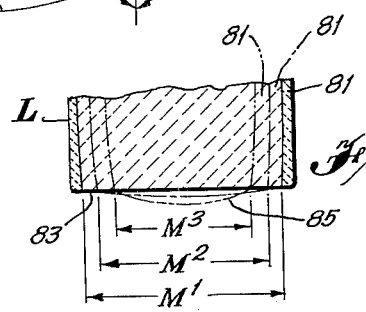
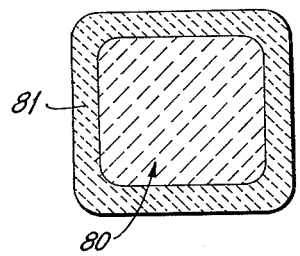
INVENTOR:
Horace N. Hall
BY Arthur Middleton
ATTORNEY

United States Patent Office

3,139,048
Patented June 30, 1964

3,139,048
REFRACTORY BRICK AND FURNACE CONSTRUCTION
Horace N. Hall, Collegeville, Pa., assignor to E. J. Lavino and Company, Philadelphia, Pa., a corporation of Delaware
Filed Nov. 16, 1960, Ser. No. 69,652
11 Claims. (Cl. 110—99)

This invention relates to refractory brick units, and their assembly into the lining and particularly the roofs of metallurgical furnaces producing steel, copper and the like. Heretofore, such bricks were made of silica, but with the use of improved metallurgical processes, especially those using oxygen, the operating temperature of the furnace has increased and the amount of contaminants carried in the furnace atmosphere has also increased. These factors, plus the more frequent tapping of the furnace, have made it desirable to use bricks of basic refractory material. Even so, the high temperatures and deleterious contaminants do deteriorate or erode rather quickly the basic bricks in the roof, and the more frequent tapping of the furnace causes such frequent great temperature changes, that the bricks tend to spall all too quickly. So it is an object of this invention to devise a brick that will overcome these disadvantages significantly. At the same time, it is becoming increasingly expensive to have the bricks laid by bricklayers due to their high wages, so it is another object of this invention to devise a brick that can be laid easily in a minimum of time by the bricklayer.

The basic refractory bricks now being substituted for the silica bricks are made of magnesia and chromite. It has been proposed heretofore to encase these bricks in a steel casing, so that when emplaced in the furnace roof, as in the arch thereof, at the first firing of the furnace, the steel is oxidized to $Fe_2O_3$, and the $Fe_2O_3$ reacts with the MgO of the brick to yield $MgO.Fe_2O_3$, called magnesio-ferrite, which takes the form of an impervious solid rigid shell having interior roughness around the refractory remainder of the basic brick, that tends to reinforce the brick against downward spalling. But even so, the great changes in temperature encountered and the absorbing of the contaminants into these bricks from the furnace, causes excessive spalling of the bricks. So it is another object of this invention to relate the size and shape of the brick to its impervious rigid shell so as to enhance the tendency of the shell to hold the brick more firmly in place and to significantly discourage spalling of the brick. This is accomplished by making the brick substantially square in cross section at the cold end portion thereof and of a size to lie from 3″ x 3″ to 3½″ x 3½″ at its "cool" end, while at the same time being faced with steel on its longitudinal faces, with the steel on one of the faces bearing embossments extending upwardly a minor distance from its edge at the "hot" end of the brick. When emplaced in the roof, the bricks in the arch thereof will present transversely of the arch, two steel clad faces with metal-to-metal contact, and the lower end of one brick will have its embossments bear against the adjacent steel clad face of the brick next to it whereupon the lower or hot ends of the bricks will be slightly spaced apart on a metal-to-metal basis. The face with the steel plate bearing the embossments in its lower end has such embossments of peculiar and significant characteristics, both as to size, shape and contour.

Since the bricks in the curved roof, sometimes called roof keys, are more or less keystone-shaped, the lower or hot ends of the bricks attain a temperature of as much as 3200° F., while at their upper or cool end the temperature attained is not much more than 800° F., provision has to be made for expansion of the hot ends during the first firing of the furnace, although practically no expansion needs to be provided for at their cold ends. This is accomplished in the practice by providing the so-called embossments in only one steel clad transverse face of a brick, and as said before, the characteristics of these embossments is critical. In making the faces of the bricks steel clad, the steel plates have to be cemented or otherwise adhered to the face of the refractory brick, for holding the steel in place during shipment of the bricks and their emplacement in the furnace. Upon first firing of the furnace, this adhesive is destroyed by the heat attained, but at the heat attained, the steel plate reacts with the magnesia of the brick to form the magnesio-ferrite on the brick as above described, so the adhesive is no longer necessary. But during the time that the adhesive is effective, it is imperative that a maximum area of adhesive-bearing surface be provided on the brick, or between the brick and the steel. Therefore, the embossments on the steel must be constructed and arranged to provide a minimum of embossed area on the steel and a maximum area of glued surface on the brick. When the steel-clad bricks are placed by the bricklayers in the furnace roof, in the metal-to-metal contact, it is important that each brick be stabilized with respect to its neighbor in a transverse direction in the roof arch, so it is also important that the embossments be so constructed and arranged that this stability is accomplished and there is little or no tendency for a brick to tilt about its longitudinal axis with respect to its neighbor brick. This is accomplished by the location or disposition of the embossments.

Prior art arrangements have employed refractory brick units along with separate spacer means which are inserted between the adjacent units, these spacer means being combustible so that they are melted or burned out upon the initial firing of the furnace. The utilization of such separate spacer means is disadvantageous due to the additional handling necessary in shipping the bricks and the spacer means, and in addition, the time required for assembling the roof is considerably greater when it is necessary to separately insert such spacer means between the various bricks. This, of course, is a major item in the present-day economy, in view of the high wages paid to bricklayers and similar artisans. Prior art structures utilizing internal plates are considerably more expensive than the arrangement of the present invention wherein plates are fixedly secured to the side faces of the brick, and yet comparative tests have proved that the structural arrangement of the present invention is equal to or superior in results to the more expensive prior art constructions.

The layer of magnesio-ferrite formed on the bricks of the present invention may vary from about ⅛ to ¼ inch in thickness, and the lower porosity of this protective layer is of significant advantage in providing greater resistance to absorption of destructible contaminants which may come in contact therewith. In the construction of the present invention, the spacer means is provided in a most simple and efficacious manner and yet serves to effectively space the lower or hot end portions of the bricks so that they may readily expand upon initial firing of the furnace. The double thickness of metallic plates as provided between adjacent bricks of the present invention serve to ensure that an effective layer of magnesio-ferrite will be provided about each of the refractory bricks.

The plates on each of the faces of the individual units are spaced from the longitudinally extending arrises of the bricks to provide tunnels through which heat may rise when the furnace is initially fired to provide a more uniform distribution of heat between the hot end of the brick and the cold end thereof. In addition, the substantially square configuration of the various bricks further ensures that substantially uniform results will be obtained and further that a maximum resistance to spalling will be provided. The bricks do in fact taper slightly along the longitudinal faces thereof so that they are slightly keystone-shaped whereby when assembled the units are adapted to form an arch in a well-understood manner.

The spacer embossments provided in the plate upon one lateral face of each of the units is a particularly important feature of the present invention. These embossments extend outwardly from the brick and also extend longitudinally of the associated plate. Preferably, a pair of spaced embossments are provided to thereby provide maximum stability, and further the embossments extend out of the plane of the plate a relatively small distance longitudinally of the plate only a minor portion of the total length of the plate. In fact, the extent of longitudinal dimension of these embossments is such that it will not exceed 20 percent of the length of the plate. With this construction, the plates on adjacent lateral faces of the various bricks will be disposed closely adjacent one another and yet slightly spaced thereby enabling the heat upon initial firing of the furnace to penetrate up between the plates and yet at the same time assuring that the space between the bricks will be effectively filled in by the natural expansion of the bricks.

The plates provided on the longitudinal faces of the bricks are provided with integral tabs which are bent over the cold ends of the bricks, these tabs serving to indicate to the most inexperienced bricklayer the manner in which the units are to be assembled. The tabs are aligned with the longitudinal dimension of the roof, and accordingly, a simple and fool-proof expedient is employed for ensuring that the bricks will be properly aligned when assembled. In addition, these bent-over tabs serve to hold the plates on the longitudinal faces of the bricks in operative position upon the first firing of the furnace. This is necessary since the adhesive substance holding these plates in place will be initially melted. As this adhesive is melted and before the plates are held in position by the chemical reaction between the plates and the refractory brick material, there is a possibility that the plates might slip down between the bricks. These bent-over tabs positively ensure that the plates on the longitudinal faces of the bricks are maintained in operative position and will not slip down between the bricks. This is necessary when considering the plates adjacent the longitudinal faces of the bricks, but there is no necessity for providing similar means on the plates adjacent the lateral faces of the bricks since the lateral joints between the bricks are under pressure due to the keystone shape of the bricks and the curvature of the arch formed thereby. It is accordingly a still further object of the invention to ensure that the units are assembled in the proper relationship in a fool-proof manner and that the plates on the longitudinal faces of the bricks will not fall out during initial firing of the furnace.

Other objects and many attendant advantages of the present invention will become more apparent when considered in connection with the specification and accompanying drawings, wherein:

FIG. 1 is a perspective view partially broken away illustrating a portion of the roof of a conventional open-hearth furnace;

FIG. 2 is a bottom view broken away of the assembled roof looking from the interior of the furnace prior to the initial firing of the furnace.

FIG. 3 is a side view of one of the refractory brick units according to the present invention;

FIG. 4 is a top view of the unit shown in FIG. 3;

FIG. 5 is an enlarged end view broken away of a portion of the apparatus shown in FIG. 3;

FIG. 6 is a sectional view broken away taken along line 6—6 of FIG. 5 looking in the direction of the arrows;

FIG. 7 is a perspective view of a pair of units illustrating the manner in which they are adapted to be assembled relative to one another;

FIG. 8 is a longitudinal section through one of the refractory brick units after the shell has been formed about the unit;

FIG. 9 is a sectional view taken along line 9—9 of FIG. 8 looking in the direction of the arrows; and FIG. 10 is a sectional view similar to the lower portion of FIG. 8 illustrating the manner in which the armor protective layer is built up during successive firings in the furnace.

Referring now to the drawings wherein like reference characters designate corresponding parts throughout the several views, there is shown in FIG. 1 a portion of a roof of an open-hearth furnace wherein one of the conventional skews formed by a row of bricks is indicated by reference numeral 10, it being understood that a plurality of the refractory units according to the present invention are disposed in side-by-side relationship to form an arch between skew 10 and a similar skew formed at the other side of the furnace. The arrow A indicates the lateral dimension of the roof, or the width thereof, while the arrow B indicates the longitudinal dimension of the roof, or the length thereof.

A conventional jack means 15 is suspended from a support and is pivotally connected at the lower end thereof to a plate means 16 which is in turn connected with a beam 17. A plurality of similar spaced support plates 20 extend laterally of the roof and are inserted between adjacent rows of refractory brick units in a known manner for supporting the roof of the furnace in operative position.

Spaces 22 are provided in plates 20 through which the beam 17 extends, and steel straps 23 are disposed in spanning relationship to the spaces 22 defined by the plates, the straps 23 overlying the upper surface of the beam 17. It is evident that with this relatively conventional construction, the roof formed of the finally fused refractory brick units will be maintained in operative relationship with respect to the remaining structure of the furnace.

As seen in FIG. 1, a plurality of rows 25 of refractory brick units are shown as being disposed in side-by-side relationship, each of the refractory brick units including a pair of opposite faces which face longitudinally of the furnace roof and a pair of opposite lateral faces which face laterally of the furnace. It will be understood that after the furnace is initially fired, these various rows of units will be permanently fused to one another. It will be noted that as seen in FIG. 1, tab means 26 are provided on the various units, these tabs being more fully hereinafter described. These tabs are aligned longitudinally of the furnace so that they will all extend in a longitudinal direction and the tabs of adjacent units will be aligned with one another as seen in FIG. 1. It is believed that the construction of the individual refractory brick units can best be understood by reference to FIG. 7 of the drawing. In this figure, a pair of adjacent identical units 30 and 30' are illustrated. Unit 30 includes a pair of opposite longitudinal faces 32 and 33 and a pair of opposite lateral faces 34 and 35. The similar faces on unit 30' are provided with the same reference numerals primed. The units 30 and 30' include cold end faces 37 and 37' respectively and the opposite end faces 38 and 38' form the hot end faces which, of course, are adapted to be disposed in facing relationship to the interior of the furnace when in assembled position.

As discussed hereinbefore, an important feature of the present invention is the fact that the refractory body portion of each of the units is of substantially square configuration.

In fact, the cold end face of the brick is actually square, and for the purpose of illustration, the cold end face of the units 30 and 30' is designated as having a 3" x 3" end face. It will be readily realized that this particular dimension has been chosen merely for the purpose of illustration, but this dimension is relatively critical. In other words, it is considered to be uneconomical to make the end face dimension of the brick of less than a 3" x 3" dimension, and on the other hand, a larger end face dimension of 3½" x 3½" is considered to be the maximum size which would generally be employed and still obtain the desired end result.

Each of the refractory brick units does taper slightly along the longitudinal faces thereof, and as indicated in FIG. 7, the longitudinal faces may taper from a dimension of 3" at the cold end to 2¾ inches at the hot end thereof. This amount of taper is necessary in order to provide the desired keystone-shape which permits the units to be assembled so as to provide an arched roof. Nevertheless, the overall cross sectional configuration of the refractory bodies of the various components are substantially square throughout.

As seen particularly in FIGS. 2, 3, 4 and 7, a metallic plate, preferably formed of steel or similar ferrous material is secured to each of the four side faces of the body of refractory material. Considering firstly the longitudinal faces 32 and 33 of the unit, a first plate 40 is secured to face 32 and a second plate 41 is secured to face 33. Each of these plates is secured to the refractory body preferably by cementing, the adhesive employed being such that it will be readily melted and ultimately destroyed by the heat of the furnace when the furnace is fired. A thin layer of adhesive is preferably provided between the contacting surfaces of the plates 40 and 41, and the adjacent portions of the refractory body.

As can be most clearly seen in FIG. 7, the lower edge portion 45 of plate 40 is spaced from the hot end arris 46 of the body of refractory material. Additionally, edges 47 of plate 40 are spaced from longitudinally extending arrises 48 of the refractory body. The opposite plate 41 is also spaced from the hot end arris and the longitudinally extending arrises of the associated longitudinal face of the unit.

Plates 40 and 41 are also provided with integral tab portions 26 formed at the upper ends thereof, these tabs being bent over the cold end arrises 52 of the refractory body and being disposed in overlying relationship to the cold end face 37 of the refractory body. These tabs 26 serve to indicate the alignment of the units as discussed previously. Additionally, as described previously, these tabs keep the plates along the longitudinal faces of the bricks from falling out before they have been retained in place due to the reaction between the plates and the refractory material of the brick.

It will also be noted that the top edge portion 55 of plate 40 adjacent to the integral tab portion 26 is disposed substantially flush with the associated cold end arris 52.

Referring now to the lateral faces 34 and 35, these faces have adhesively secured thereto plates 60 and 61, these plates being of different construction.

Referring firstly to the construction of plate 60, the interrelationship of this plate 60 to its associated lateral face 34 may be seen most clearly in FIG. 3. As seen in this figure, the bottom edge portion 62 thereof is spaced from the adjacent hot end arris of the refractory body, and the longitudinally extending edges 63 thereof are spaced from the longitudinally extending arrises of the refractory body.

Spacer means in the form of embossments are provided at the lower edge portion 62 of the lateral plate 60, and a pair of such embossments are indicated generally by reference numerals 64 and 65, these embossments being of similar construction. The particular configuration of these embossments may be more clearly seen in FIGS. 5 and 6. As seen in these latter figures, the embossments each include a central raised portion 64' and 65', which is connected by sloping portions 64" and 65" with the adjacent portions of the plate. The two embossments 64 and 65 are spaced from one another a substantial distance to provide stability against tipping of the units with respect to one another when in assembled relationship, and as seen particularly in FIG. 6, the embossments are spaced a maximum distance outwardly of the main plane of the plate at the lower edge portion of the plate and taper toward the central portion of the plate into the plane of the plate. As clearly seen in FIGS. 5 and 6, a layer of adhesive 68 such as cement or the like is disposed between the plate and the adjacent face of the refractory body for retaining the plate in position.

As mentioned previously, the embossments or spacer means extend only a minor portion of the length of the associated plates and will not exceed 20 percent of the length of the plates. In fact, in many cases, the longitudinal dimension of the embossments will be considerably less than 20 percent of the length of the associated plate, and in fact, as seen in the drawings, the longitudinal dimension of the embossments is only approximately 5 percent of that of the overall plate. The longitudinal dimension of the embossments is related to the degree to which the embossments extend out of the plane of the plate. For example, where the embossments extend out of the plane of the plate approximately .018 inch, the longitudinal dimension of the embossments may be approximately 5 percent of that of the plate. On the other hand, where the embossments may extend out of the plane of the plate approximately .030 inch, the embossments may extend approximately 20 percent of the length of the plate.

The plate 61 secured to the opposite lateral face 35 of each of the refractory brick units is a flat plate, this flat plate being so mounted that the lower edge thereof is spaced from the hot end arris of the associated face while the longitudinal edges thereof are spaced from the longitudinally extending arrises of the associated face, and the top edge thereof is disposed substantially flush with the cold end arris of the associated face.

Referring again to FIG. 7, the manner in which the adjacent units are to be assembled with respect to one another is indicated by the arrows XX, these arrows indicating that the flat plate on the lateral face of one unit is to be disposed in abutting relationship with the plate on the lateral face of an adjacent unit having the embossment spacers formed therein. It will, of course, be understood that in FIG. 7, the unit 30' has been given the same reference numerals primed throughout as applied to the unit 30 of this figure.

Referring now to FIG. 2 of the drawing, the manner in which the various units are assembled with respect to one another prior to firing of the furnace is illustrated. For the purpose of illustration, the unit 30 is shown in this figure in association with units identical thereto. It will be seen that the plates 40 and 41 on the opposite longitudinal surfaces thereof are in abutting relationship with corresponding plates on the adjacent units. The plates 60 having the projections in one lateral face thereof is in abutting relationship with the flat plate on the lateral face of an adjacent unit having no projections thereon. The flat plate 61 on the opposite face of unit 30 is in engagement with the plate of an adjacent unit having the spacer embossments formed thereon. In this manner, spaces 70 and 71 are provided between the plates on the lateral faces of adjacent units. These spaces, of course, have a maximum dimension adjacent the hot ends of the units to permit thermal expansion adjacent the hot ends. These spaces 70 and 71, of course, are tapered and decrease in dimension toward the opposite or cold end portion of the units where the necessity for expansion space decreases accordingly. In addition, it will be noted that as seen in FIG. 2, the spacing of the longitudinal edges of the various plates from the longitudinally extending arrises of the refractory bodies of the various units provide tunnels 75, 76, 77 and 78 through which the heat may rise upon initial firing of the furnace to provide a more uniform distribution of the heat along the length of the units.

Referring now to FIGS. 8 and 9, the structure of an individual unit is illustrated in a somewhat schematic manner. In these figures, the body of refractory material is indicated by reference numeral 80. The outer armor protective layer 81 formed of magnesio ferrite will be seen to taper from a minimum thickness at the cold end portion 82 of the unit to a greater thickness at the hot end portion 83 of the unit. It should be understood that the layer of shell 81 starts to form upon the first firing, and that a certain thickness of shell is formed at the first firing. The total formation of the shell takes place incrementally during further firings, and accordingly, the shell on each brick grows incrementally in thickness and progressively with time as it is utilized during normal service. The unit illustrated in FIGS. 8 and 9 illustrates a unit wherein the shell has been subjected to a number of firings.

As seen in the bottom portion of FIG. 8, a small depending bulge 85 indicates a certain degree of spalling, and it will be noted that cracks 86 are formed within the refractory material above the inner or hot end of the brick. However, even though the spalling does occur and the cracks may be spaced as much as one and one-half inches from the hot end of the brick, the casing of magnesio-ferrite due to its size, dimensions, and arrangement in a substantially square configuration holds the pieces in place and prevents them from dropping into the furnace. By so holding the spalls in place, the roof life is substantially increased.

The cross section of FIG. 9 illustrates that the protective armor 81 formed about the body of refractory material 80 is formed substantially uniformly about the refractory material itself to reduce the spalling effect to a minimum.

Referring now to FIG. 10, the manner in which the protective armor layer builds up is illustrated. Upon the initial firing of the furnace, an outer layer indicated by letter L is initially formed. Of course, the thickness of this layer will depend upon the length of time involved in the initial firing. For all practical purposes, it is assumed that the initial firing will not extend over a sufficient length of time to form a thickened layer 81 such as shown in FIG. 8 since the furnace must be subsequently tapped during normal operations. In a typical example, the initial firing will produce the outermost layer as seen in FIG. 10, and it will be noted that this defines a mouth portion indicated by reference character $M^1$, this mouth portion representing that part of the brick which is defined by the inner periphery of the protective layer at the hot end of the brick.

Upon subsequent firings of the furnace, the layer L will be increased in thickness to subsequently define a mouth portion indicated by reference character $M^2$, and subsequently the layer is thickened to define an even smaller mouth portion $M^3$. This incremental growth of the thickness of the protective layer is important, particularly in combination with the substantially square configuration of the brick. These combined factors as will be apparent serve to continually decrease the so-called mouth portion formed at the hot end of the brick, this mouth portion being the area within which the material of the brick is most likely to fall out.

It is apparent from the foregoing that there is provided a new and novel refractory brick and furnace construction wherein the units can be assembled in a very efficient and effective manner, and means is provided for aligning the units in a fool-proof fashion. The refractory material of the units is provided of a substantially square configuration so as to provide uniform end results and to minimize the deleterious effects of cracking and spalling. In addition, a complete unit is provided which can be sold commercially, there being no necessity of providing additional elements other than the unit itself. The plate on one lateral face of each of the units is provided with integral spacer means adjacent the hot end thereof which serves to permit the expansion of the refractory material as normally occurs, and at the same time these spacer means are so constructed as to provide a maximum area for adhesively securing the plates to the faces of the units and stabilizing the adjacent units against relative tilting movement when assembled.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In a furnace roof construction, a plurality of refractory brick units, each of said units including a pair of opposite longitudinal faces facing longitudinally of the roof and a pair of opposite lateral faces facing laterally of the roof, each of said units including a hot end face adapted to be positioned in facing relationship to the interior of a furnace and a cold end face remote from said hot end face, the lateral faces of adjacent units being in side-by-side relationship and the longitudinal faces of adjacent units being in side-by-side relationship, each of the faces having a metallic plate fixedly attached thereto, each of said plates being spaced from the hot end arris and the longitudinally extending arrises of the associated face such that when the units are disposed adjacent to one another, tunnels are defined between the adjacent longitudinally extending arrises for transmitting heat longitudinally of the bodies, the plate secured to one lateral face of each unit having integral hollow and compressible spacer means formed therein adjacent the hot end arris of the lateral face, said spacer means extending only a minor portion of the length of the plate, the remaining major portion of the length of the associated plate lying substantially in a plane, the plate fixed to the opposite lateral face of each unit being flat, said units being assembled such that the spacer means formed on the plate of the lateral face of one unit abuts against the flat plate secured to the lateral face of the adjacent unit.

2. Apparatus as defined in claim 1, wherein the body of each of said units is substantially square at the cold end portion thereof, the longitudinal faces of each of said bodies tapering slightly toward the hot end face thereof to define a substantially keystone-shaped unit.

3. A furnace for the making of steel and the like having a curved surface such as an arched roof made up of a plurality of refractory brick units of magnesia-bearing refractory material substantially square in cross section at their cool end farthest from the furnace lying in a range from 3 inch x 3 inch to 3½ inch x 3½ inch and at their hot end nearest the furnace the same size longitudinally of the arch but slightly less in width laterally of the arch, a plurality of separate steel plates each of which is permanently secured to one face of the brick so that any two adjacent bricks present a metal-to-metal contact, said plates each being spaced from one another, at least one integral embossment only on the steel plate on a lateral face of said brick adjacent the bottom edge of the plate, said embossment extending outwardly from a point adjacent the bottom of the brick a minor proportion of the length of the brick, said embossment adapted to contact an adjacent brick in said furnace and space it from said plate, and said embossment being compressible into the plane of said plate.

4. A refractory brick unit for use in the construction of a roof of a furnace comprising a body of refractory material having a pair of opposite longitudinal faces adapted to face longitudinally and extend circumferentially of the roof and a pair of opposite flat lateral faces adapted to face laterally of the roof, said body also including a hot end face adapted to be positioned in facing relationship to the interior of a furnace and an opposite cold end face remote from said hot end face, said body having a substantially square configuration at the cold end portion thereof and being slightly out of square at the hot end portion thereof, a separate flat metallic plate adhesively secured to each of said longitudinal faces and each of said lateral faces, each of said plates being spaced from the hot end arris and the longitudinally extending arrises of the associated face, one of said plates secured to a lateral face of the unit having a pair of spaced embossments formed in the end portion thereof adjacent the hot end face of the body, said embossments extending less than 20% of the length of the associated plate, the total widths of said embossments being less than half the width of said one plate, each of said embossments including a flat plateau inclined with respect to said one face and having outer and inner ends, said outer end being adjacent said hot end face and spaced from said one face, said inner end being coplanar with the plane of said one plate, each of said embossments including a pair of triangular side walls integrally secured to said plateau and said one plate, said walls sloping laterally with respect to said one face and away from the side edges of the plateau so as to form an angle with said one face of less than 45° whereby said embossments may be readily flattened when pressed against an adjacent brick, one side of said one plate lying flat against and adhesively secured over its entire area to said one lateral face, each of the plates secured to the longitudinal faces of the body including integral tab portions bent over the cold end arris of the associated face and being disposed in overlying relation to the cold end of the body for indicating the manner in which the units are to be aligned when assembling a roof.

5. A refractory brick as defined in claim 4, wherein said spacer means is hollow whereby it may be flattened by expansion of adjacent bricks in said furnace.

6. A refractory brick as defined in claim 5, wherein said spacer means includes at least one sloping side wall of the same thickness as said plate means adjacent one of said faces, said sloping side walls forming a small acute angle with said one face and adapted to be flattened against said one face by the expansion of an adjacent brick.

7. A refractory brick as defined in claim 4, wherein said spacer means comprises spaced hollow embossments opening into the hot end edge of said plate means.

8. A refractory brick as defined in claim 7, wherein said embossments have side walls forming an acute angle with said one face.

9. A furnace according to claim 3, with the addition that embossments on the steel covering are two in number and spaced apart to give stability to the brick to prevent tilting axially when emplaced.

10. A furnace according to claim 3, with the addition that the steel covering on two faces of the brick longitudinally of the arch extend upward and provide tabs bent-over on the upper and cool end of the bricks so as to present to the bricklayer a guide as to which direction the square-topped brick should be emplaced in the arch.

11. A furnace for the making of steel and the like having a curved surface such as an arched roof made up of a plurality of refractory brick units of magnesia-bearing refractory material substantially square in cross section at their cool end farthest from the furnace lying in a range from 3 inch x 3 inch to 3½ inch x 3½ inch and at their hot end nearest the furnace the same size longitudinally of the arch but slightly less in width laterally of the arch, a plurality of separate steel plates, one of said plates being permanently secured to one face of the brick and another of said plates being permanently secured to a lateral face of the brick, at least one integral embossment only on the steel plate on a lateral face of the brick adjacent the bottom edge of the plate, said embossment extending outwardly from a point adjacent the bottom of the brick a minor proportion of the length of the brick, said embossment adapted to contact an adjacent brick in said furnace and space it from said plate, and said embossment being compressible into the plane of said plate.

References Cited in the file of this patent

UNITED STATES PATENTS

| | | |
|---|---|---|
| 2,187,669 | Stewart | Jan. 16, 1940 |
| 2,192,642 | Griffith | Mar. 5, 1940 |
| 2,465,170 | Rochow | Mar. 22, 1949 |
| 2,853,872 | Samuel | Sept. 30, 1958 |
| 2,915,893 | Wilkins | Dec. 8, 1959 |
| 3,005,424 | Heuer | Oct. 24, 1961 |

FOREIGN PATENTS

| | | |
|---|---|---|
| 236,203 | Switzerland | June 1, 1945 |